United States Patent [19]
Lilja et al.

[11] 4,278,494
[45] Jul. 14, 1981

[54] IMMERSION EVAPORATOR

[75] Inventors: Launo L. Lilja; Valto J. Mäkitalo, both of Pori; Timo T. Koivunen, Ulvila, all of Finland

[73] Assignee: Outokumpu Oy, Helsinki, Finland

[21] Appl. No.: 136,525

[22] Filed: Apr. 2, 1980

[30] Foreign Application Priority Data

Apr. 2, 1979 [FI] Finland ............................... 791094

[51] Int. Cl.$^3$ ................................................. B01D 1/14
[52] U.S. Cl. .................................. 159/16 A; 159/45; 431/185
[58] Field of Search ............... 159/16 A, 45; 431/160, 431/185

[56] References Cited

U.S. PATENT DOCUMENTS

| | | | |
|---|---|---|---|
| 1,878,926 | 9/1932 | Yarrow | 431/185 |
| 2,770,295 | 11/1956 | Allen, Jr. | 159/16 A |
| 2,815,069 | 12/1957 | Garraway | 431/185 |
| 3,322,181 | 5/1967 | Williams | 159/16 A |

Primary Examiner—Norman Yudkoff
Attorney, Agent, or Firm—Brooks, Haidt, Haffner & Delahunty

[57] ABSTRACT

An immersion evaporator is disclosed having, connected to its evaporation vessel, a pipe for feeding a solution to be concentrated by evaporation into the evaporation vessel, a riser pipe for withdrawing the concentrated solution and any crystals from the evaporation vessel, a pipe for withdrawing flue gases and vapors from the evaporation vessel, and an immersion pipe extending vertically inside the evaporation vessel, the upper end of the immersion pipe being connected, by means of an angle joint piece to the outlet of the combustion chamber, there being at the opposite end of the combustion chamber, a burner for liquid or gaseous fuel, the burner having a cylindrical combustion gas turbulence chamber for an oxygen-bearing combustion gas, at one end of which there is a substantially tangential combustion gas inlet conduit and a fuel dispersion pipe extending coaxially into the turbulence chamber, the opposite end of the turbulence chamber being convergent. The tangential combustion gas inlet conduit is connected to a mantle which surrounds the burner and the combustion chamber, there being, at the opposite end of the mantle, a fuel inlet conduit for preheating the fuel, and the convergent end of the turbulence chamber continues into the combustion chamber as a cylindrical leveling conduit coaxial with the turbulence chamber, and the fuel dispersion pipe has at least such a length that it extends to the distance defined by the formula $$\frac{H}{D} = \frac{\sqrt{(\frac{d}{D})^2 + \cos\alpha}}{\sin 2\alpha} - \frac{d}{2D}\tan\alpha - \frac{1}{2\tan\alpha}$$

from the inner end of the leveling conduit, in which formula H is the distance between the inlet end of the leveling conduit and the dispersion pipe, $\alpha$ is the andle of convergence of the opposite end of the turbulence chamber, d is the outer diameter of the dispersion pipe, and D is the inner diameter of the leveling conduit.

12 Claims, 4 Drawing Figures

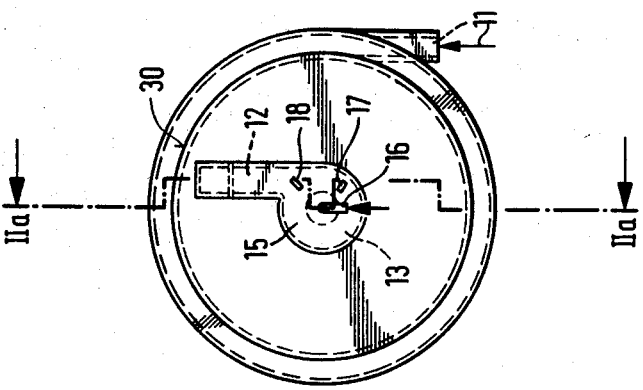
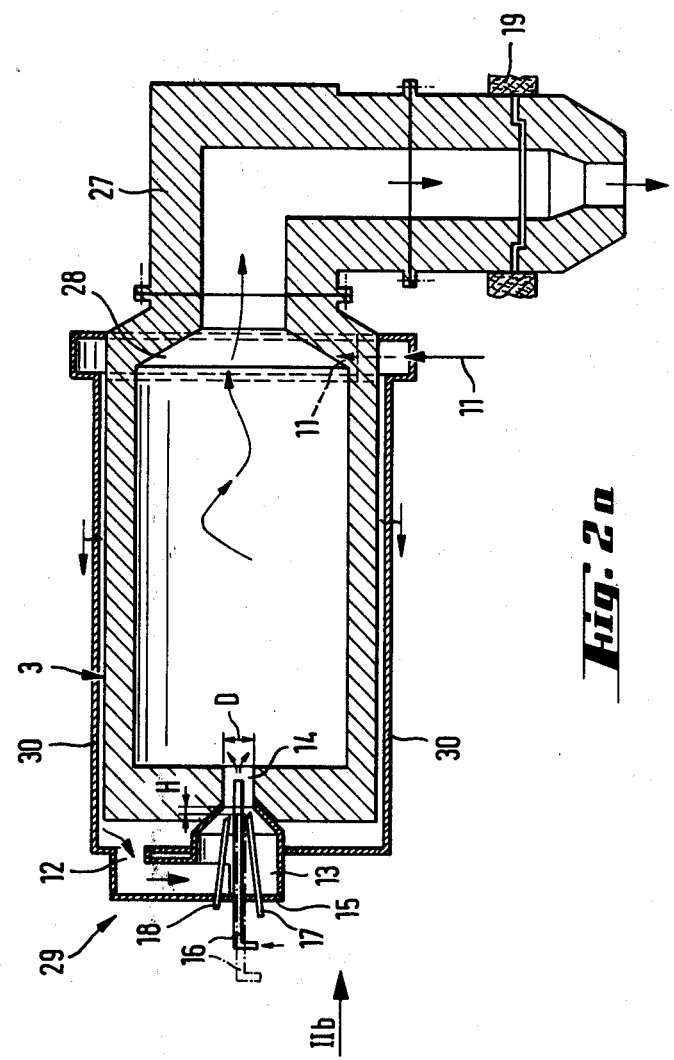

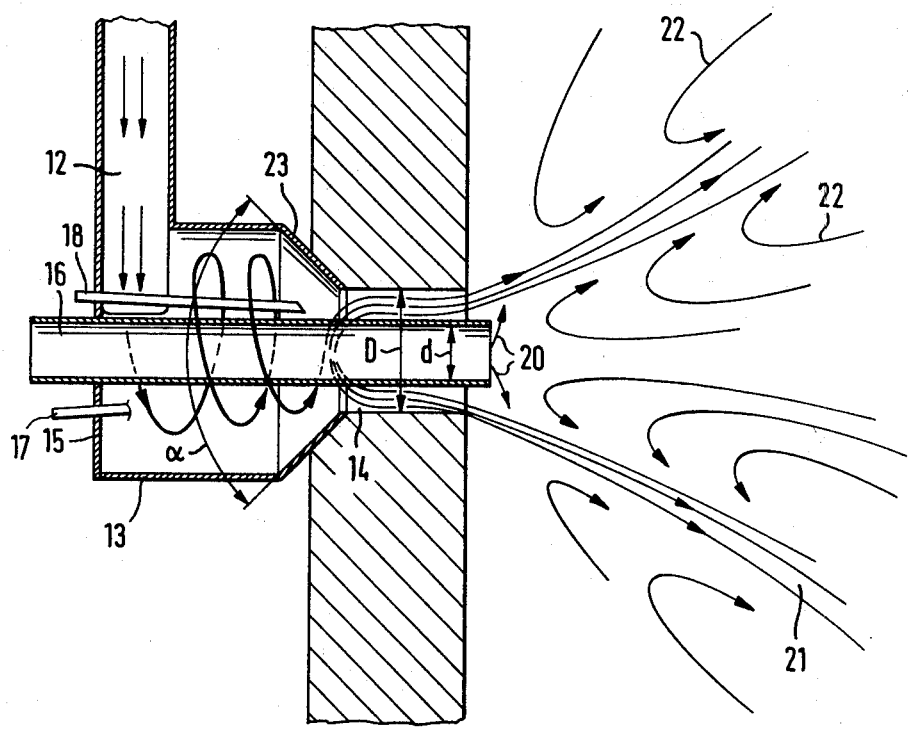

IMMERSION EVAPORATOR

BACKGROUND OF THE INVENTION

1. Field of the Invention

The present invention relates to an immersion evaporator having a pipe connected to an evaporation vessel, for feeding the solution to be treated into the evaporation vessel, a riser pipe for removing the concentrated solution and any crystals from the evaporation vessel, a pipe for removing flue gases and vapors from the evaporation vessel, and an immersion pipe extending substantially vertically inside the evaporation vessel, for directing hot flue gases below the surface of the solution in the evaporation vessel.

2. Description of the Prior Art

The term immersion evaporator denotes a device in which hot flue gases are directed below the surface of the liquid to be evaporated.

In direct emmersion evaporation, the flue gases discharging from the immersion pipe are allowed to bubble through the solution. In this manner it is possible to produce a highly effective transfer of heat and material from the flue gases into the liquid being treated. Since heat exchangers are not required, the question of material do not cause problems. For this reason, direct immersion evaporators are used, especially in metallurgical and chemical processes in which corroding conditions cause problems in material selection, for example, in the heating and evaporation of strongly acidic solutions.

In immersion evaporators, the immersion pipe is usually installed in a vertical position in order to minimize the amount of material which comes into direct contact with the liquid to be treated.

Previously known are numerous different immersion evaporators. In these evaporators, the objective has usually been an apparatus of minimum possible size in order to reduce the investment coast. The reducing of the apparatus size, however, causes a decrease in the volume of flue gases prior to the discharge point, and in this case even slight variations in the feed of fuel or combustion gas cause great variations of pressure in the immersion pipe. For this reason, rather complicated immersion pipe structures, with all the involved problems, have been developed.

Aiming at a small size is also disadvantageous for the reason that the detrimental thermal effect of combustion per one surface unit of the apparatus increases, and thereby the quality and endurance of the material are put to a hard test.

In general, the combustion chamber is installed directly above the immersion pipe, as its continuation, and it bears on the structures of the treatment vessel. This arrangement has certain drawbacks. First, with high capacities it is necessary either to reduce proportionately the size of the combustion chamber, thereby causing load problems, or to enlarge the evaporation vessel unnecessarily so as to be able to fit the combustion chamber above it. Secondly, the vibrations occurring in the combustion chamber and the immersion pipe, and any liquid drops splashing in it (cf. U.S. Pat. No. 3,276,443), have a detrimental effect on the lining of the furnace so that especially the horizontal vault of the combustion chamber is easily damaged and can collapse. Also, the entire combustion chamber must be detached during the maintenance of the immersion pipe.

However, from the publication Gas Värme International Bp 19, No. 6 (June 1970), page 229, an immersion evaporator is known in which the combustion chamber is in a horizontal position and connected to a vertical immersion pipe by means of a right-angled joint piece. In this structure, the size of the combustion chamber is independent of the size of the evaporation vessel, and the liquid drops splashing into the immersion pipe cannot affect the lining of the combustion chamber.

In an immersion evaporator according to the invention, the combustion chamber is provided with a burner for liquid or gaseous fuel, the burner having a cylindrical turbulence chamber for an oxygen-bearing combustion gas, there being at one end of the chamber a substantially tangential combustion gas inlet conduit and a fuel dispersion pipe extending coaxially into the turbulence chamber, in which case the opposite end of the turbulence chamber is convergent in order to increase the angular velocity of the combustion gas before the fuel discharging from the dispersion pipe is mixed with it.

In the immersion evaporator according to the invention, a burner is used by means of which the fuel and the oxygen-bearing combustion gas can be effectively mixed with each other, either in the burner or in the combustion chamber. The object is to provide an immersion evaporator in which a flow field is formed in front of the burner, the fuel and the oxygen-bearing combustion gas being mixed in this field rapidly and within a consistent velocity range so that the combustion proceeds to a certain stability field of the spray and stabilizes in this velocity field. A suitable velocity field can also be obtained by fitting a solid object in the spray. An area of a suitably low flow velocity is formed behind this object and the flame stabilizes there, as described in German Application Ser. No. 24 34 459.

U.S. Pat. No. 3,185,448 discloses a burner in which the fuel is sprayed into a toroidal turbulence formed from the combustion air. This turbulence is produced either by directing the combustion air into the combustion chamber from its opposite end or by means of baffling members extending into the combustion chamber.

Also previously known are burners in which the combustion gas is caused to revolve about its axis of travel, in which case centrifugal force spreads the spray so that its travel velocity is attenuated relatively rapidly in order to create a suitable velocity range for the combustion. A great number of turbulences with a mixing effect appear in such a spray.

In the burner according to German Application Ser. No. 21 33 126, the inlet for discharging combustion gas into the combustion chamber has the shape of a diverging cone having a throttling area with rounded corners. This is in order to direct the combustion gas spray so as to spread it relatively gently and to form an ignition field in the conical flare of the discharge opening.

Burners usually require safety devices and auxiliary devices, such as flame guards and ignition devices. Fitting these auxiliary devices in the burner often causes great difficulties. Often the auxiliary devices must be placed at a point where their useful life is short owing to the heat.

Furthermore, in several known burners, flame-baffling members are used which extend inside the combustion chamber and are thereby exposed to the flame, or structures are used which have a large opening via which the radiation of the combustion chamber and the flame can reach the inner parts of the burner.

The object of the present invention is therefore to provide an immersion evaporator provided with a burner of the type mentioned above; by means of this burner it is possible to obtain a very effective field of mixing using a very small discharge opening, from which a consistent and highly turbulent spray is obtained.

An object of the present invention is also to achieve an immersion evaporator, in which the turbulence of the oxygen containing burning gas is created by introducing the burning gases tangentially to the turbulence chamber. By the method the disadvantages are avoided that are encountered when turbulence is brought forth or fortified by the aid of conducting or auxiliary means, e.g. by baffles. In prior art burners the baffles used for the creation of turbulence have prevented the observation and an effective regulation of the burning.

The object of the present invention is in particular to provide an immersion evaporator, in which it is possible to burn heavy fuel oil, which has so far been found difficult to burn. The requirements to be set on the burner increase with decreased volatility of the fuel, i.e. approximately according to the flash point of the fuel. In order to achieve sufficient vaporization, the fuel must usually be atomized into very fine droplets, less than 100 micrometers, and in order to achieve this it has been necessary to heat the fuel oil to 370° K. at minimum.

SUMMARY OF THE INVENTION

In the immersion evaporator according to the invention, the tangential combustion gas inlet conduit to the burner has been connected to a mantle which at least partly surrounds the burner and the combustion chamber; at that end of the mantle which is opposite in relation to the burner there is an inlet conduit for combustion gas in order to preheat the gas before it is fed into the burner, and the convergent end of the turbulence chamber continues into the combustion chamber as a cylindrical leveling conduit coaxial with the turbulence chamber. The fuel dispersion pipe has in this case at least such a length that it extends to a distance defined by the formula $$\frac{H}{D} = \frac{\sqrt{(\frac{d}{D})^2 + \cos\alpha}}{\sin 2\alpha} - \frac{d}{2D}\tan\alpha - \frac{1}{2\tan\alpha}$$

from the inner end of the leveling conduit. In the formula, H is the distance between the inlet end of the leveling conduit and the dispersion pipe, $\alpha$ is the angle of convergence of the opposite end of the turbulence chamber, d is the outer diameter of the dispersion pipe and D is the inner diameter of the leveling conduit.

DESCRIPTION OF THE DRAWINGS

FIG. 2a depicts a side elevational cross section of a combustion chamber and its burner used in the immersion evaporator according to the invention, FIG. 2b illustrates an end view of the burner and combustion chamber of FIG. 2a, and FIG. 3 depicts a schematic side elevational cross section of the same burner.

DESCRIPTION OF THE PREFERRED EMBODIMENTS

Figure 1:
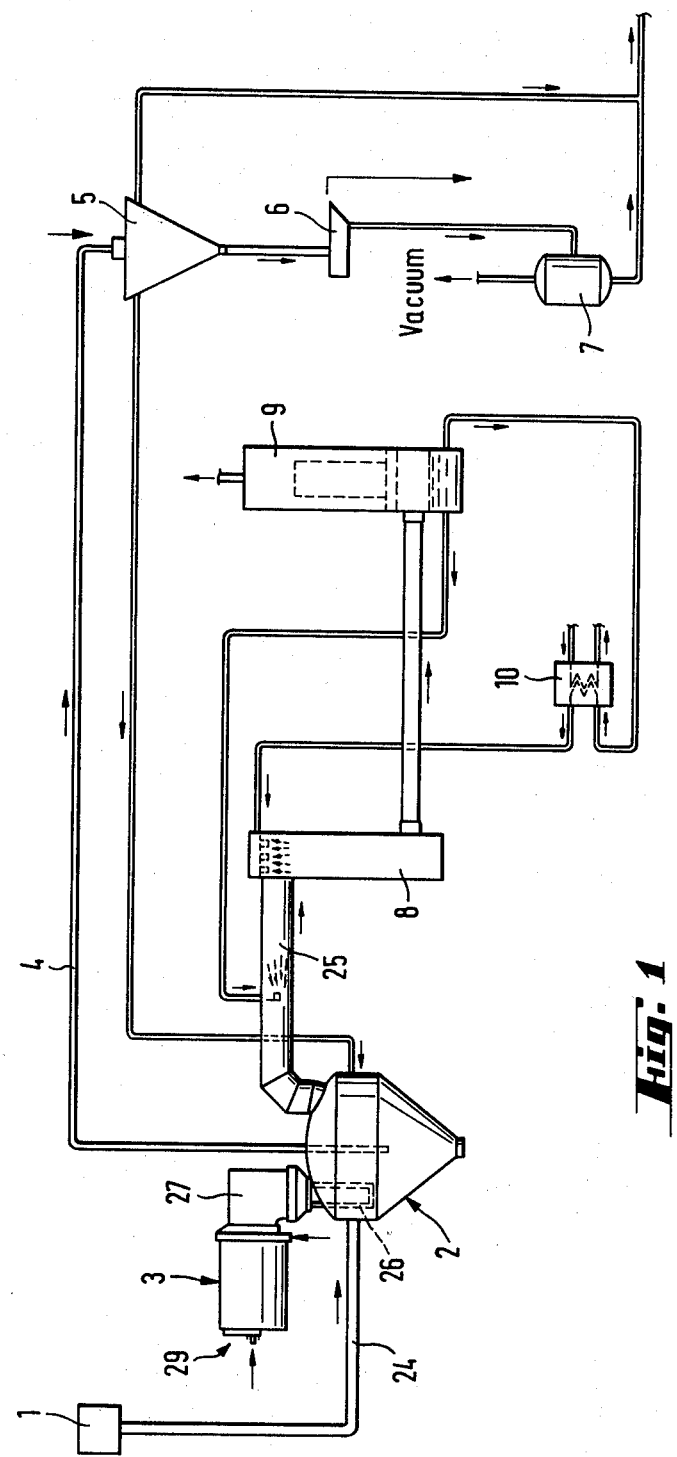
FIG. 1 illustrates a flow diagram of an evaporation-crystallization plant provided with an immersion evaporator according to the invention.

In the immersion evaporator according to a preferred embodiment of the invention, in which a horizontal combustion chamber has been connected to the upper end of the vertical immersion pipe by means of an angle joint piece, there being a burner at the combustion chamber end opposite in relation to the angle joint piece, there is a resilient member between the immersion pipe and the angle joint piece, in which case only the immersion pipe has been attached directly to the evaporation vessel. Thus, the vibrations due to the operation of the immersion pipe do not affect the combustion chamber, which can be supported independently of the evaporation vessel.

Furthermore, the inlet conduit for the combustion gas to be preheated is advantageously connected tangentially to the mantle surrounding the combustion chamber, in order to obtain a more effective transfer of heat.

The dispersion pipe of the burner used in the immersion evaporator according to the invention can extend via the leveling conduit as far as the combustion chamber, but it ends preferably at a distance which is at maximum half the leveling conduit inner diameter from the outer end of the leveling conduit. It is futile to extend the dispersion pipe further into the combustion chamber, since in that case the drops discharging from it no longer hit the combustion gas flow discharging from the leveling conduit. However, the dispersion pipe must extend at minimum to the distance H, defined by the above formula, from the inner end of the leveling conduit. If the dispersion pipe is shorter, the oil drops discharging from the dispersion pipe hit the combustion gas flow at a point where the combustion gas flow is not yet strong enough to carry the fuel drops with it, but the drops remain whirling in the turbulence chamber and gradually erode through its wall.

As stated by E. Giffen and A. Muraszew in their book "The Atomisation of Liquid Fuels", Chapman & Hall Ltd. (1953), the flowing material is concentrated by centrifugal force as a thin layer on the flow conduit wall when the angular velocity is increased. In a burner according to the present invention, this thinned flow layer is directed into a special leveling conduit, which is a cylindrical conduit parallel to and coaxial with the turbulence chamber.

The leveling member has several functions. First, according to studies, it levels any pulses appearing in the gas mass and the uneven distribution of the gas directed via the one feed inlet of the turbulence chamber at the periphery of the discharge opening, and it directs the revolving gas mass in a direction parallel to the axis of the turbulence chamber. For this purpose, the length of the leveling conduit is preferably 0.5-4 times its inner diameter D. Owing to friction, the leveling conduit has a certain optimum length, which, according to studies, is approximately in the order of the leveling member diameter D.

The outer diameter d of the fuel dispersion pipe is preferably at maximum 0.75 times the inner diameter D of the leveling conduit, in which case an annular flow conduit is formed between the inner wall of the leveling conduit and the dispersion pipe, and the flow velocity in this conduit is advantageously very high. The dimensioning velocity of the leveling conduit is preferably 20-60 m/s.

The immersion evaporator according to the invention can be used advantageously for the evaporation of metal sulfate solutions and the like.

With reference to FIG. 1 is the appended drawings, the feed vessel for the solution to be evaporated is indicated by 1, and from this vessel the solution to be treated is fed into the actual evaporation-crystallization vessel 2, a substantially vertical immersion pipe 26 having been fitted through the top of this vessel.

The upper end of the immersion pipe 26 has been attached, by means of an angle joint piece 27, to a substantially horizontal combustion chamber 3, a burner 29 being located at the opposite end of this chamber. The hot flue gases emerging from the combustion chamber 3 are directed via the immersion pipe 26 below the surface of the solution to be treated in the evaporation-crystallization vessel 2, so that the hot flue gases bubble through the solution being treated.

In addition, a riser pipe 4 has been fitted through the top of the evaporation-crystallization vessel 2; the forming crystals together with the solution being treated are removed via this pipe from the evaporation-crystallization vessel 2 and directed to a settler 5, where the solution and the crystals are separated from each other. The filter for filtering the crystals is indicated by 6 and the filtrate vessel under vacuum by 7. Furthermore, a pipe 25 has been connected to the top of the evaporation-crystallization vessel 2, for removing the flue gases and vapor from the evaporation-crystallization vessel 2 and for directing them into a direct-working flue gas cooler 8 and from there on to a drop separator 9, where the sulfuric acid mist is separated from the flue gases. The heat exchanger for the recovery of the waste heat of the process is indicated by 10.

The solution to be treated is thus fed from the feed vessel 1 via the pipe 24 into the evaporation-crystallization vessel 2, where it is heated by means of hot flue gases, which have been obtained by burning oil or gas in the combustion chamber 3 by means of the burner 29, and by directing the hot flue gases from the combustion chamber 3 via the immersion pipe 26 below the solution to be treated, in which case the hot flue gases yield their heat content to the liquid as they bubble through the solution in the evaporation-crystallization vessel 2. The flue gases cool, and they leave the solution at almost the same temperature as the solution.

When metal sulfates are crystallized out of a sulfuric acid solution, the concentration of sulfuric acid at the point of operation is usually approx. 70% and the temperature of the solution approx. 140°–150° C. At this point of operation, the sulfuric acid partial pressure is still low, and certain metal sulfates have their solubility minimum at this acid concentration. The limit of the use of certain structural materials such as iron and lead is also at this concentration.

The flue gas emerging from such an evaporation-crystallization vessel 2 is at the temperature of the operation point and contains flue gases, water vapor and vaporized sulfuric acid. If the combustion has been incomplete, the discharging flue gas also contains solid particles.

The discharging flue gases are cooled by means of a flue gas cooler 8 in order to recover the heat and to facilitate the separation of the acid mist in the drop separator 9 when the temperature has decreased, in addition to which the requirements to be set on the material of the flue gas cooler 8 and the drop separator 9 can be lowered.

The sulfuric acid drops present in the flue gases are sub-micronic and therefore very difficult to remove. Technically the separation can be carried out either by means of electric filters or fiber separators (cf., for example, Perry: Chem. Engrs. Handb., 5th Edition, p. 18-82, FIGS. 18-33). It would be possible to obtain a good separation capacity with electric filters, but their high price prevents their use, and so in practice the only remaining alternative is fiber separators, when strict air protection standards must be complied with. Owing to their high resistance to chemicals and their low power requirements, fiber filters are excellent for the separation of the flue gases and sulfuric acid mist of immersion evaporation plants. Their only disadvantage is their low tolerance to solids.

When natural gas is used for fuel, it is rather easy to obtain the required solids content, but especially when heavy fuel oil is burned, great difficulties have been encountered owing to the clogging of the filters. The use of oil for fuel is often necessary owing to the unavailability of natural gas or to cost factors.

If unburned oil, or soot or ash separated from it during incomplete combustion, passes in the solution to be evaporated, this causes operational disturbances in the plant and lowers the quality of the product, since the fineness of the crystals requires a dense filter cloth for the filtration for the removal of the crystals, and such a cloth gets clogged up easily. In addition, the cleaning of the cloth with water becomes complicated. It is evident that foreign material among the product crystals always lowers the quality of the product, but the purity of the acid produced is also important, since it is usually reused, for example as a solution acid in electrolysis, and any solid particles carried along with the acid will contaminate high-quality cathodes and also interfere with the settling of the anode slime.

The burner used in an immersion evaporator must be capable of functioning at a high air coefficient, since the raising of the air coefficient lowers the boiling point of the solution. Also, the structural material of the immersion pipe 26 often sets demands regarding the air coefficient used. However, the volume of the flue gas lines and gas treatment apparatus increases with an increased air coefficient and so finding the optimum requires a regulatable combustion system. Good regulatability also allows for capacity variation due to, for example, variations in the quantity of the solution being evaported.

As can be seen from FIGS. 1 and 2a, the combustion chamber 3 in an immersion evaporator according to the invention has been installed at an angle of approx. 90° in relation to the immersion pipe 26, and the combustion chamber 3 and the immersion pipe 26 have been connected to each other by means of an angle joint piece 27, which has a resilient member 19, as seen in FIG. 2a.

In the immersion evaporator according to the invention, the combustion chamber 3 can be supported independently of the evaporation-crystallization vessel 2, and so the vibration due to the manner of operation of the immersion pipe 26 of the evaporation apparatus will not affect the combustion chamber 3. Furthermore, more room is left in the upper section of the evaporation-crystallization vessel 2 for other devices or maintenance, and the combustion chamber 3 need not be moved during maintenance. The immersion pipe 26 can be maintained or replaced without moving the combustion chamber; only the light angle joint piece 27 must be detached. Furthermore, the lining of the combustion chamber 3, and especially the masonry work of its end, lasts longer, since it is not structurally dependent and the liquid splashes cannot penetrate into the combustion chamber 3 but stop in the upper section of the angle joint piece 27. Any fuel which has not burned in the ignition or flowed into the combustion chamber 3 in a case of a damaged burner cannot contaminate the product in the evaporation-crystallization vessel 2, and the ashes of the fuel cannot fall into the evaporation-crystallization vessel 2. Neither does the size of the evaporation-crystallization vessel 2 limit the size of the combustion chamber 3, and thus the latter can be enlarged. Ignition or any other unevenness in the feed of fuel will in that case cause less pressure variation in the combustion chamber 3. Thus the life of the lining of the combustion chamber 3 is lengthened and the operation of the immersion pipe 26 is more consistent, the smaller heat load per surface umit allows the use of a less expensive material or increases the useful life of the lining and, furhermore, a fuel of a lower quality can be used.

In FIG. 2a, the cylindrical combustion chamber is indicated by 3 and the mantle around it by 30. At one end of the mantle 30 there is an inlet conduit 11 for directing an oxygen-bearing combustion gas into the space between the mantle 30 and the combustion chamber 3 in order to preheat the combustion gas, and at the opposite end of the mantle 30 there is a conduit 12 for directing the preheated combustion gas into the burner 29. The combustion gas inlet conduit 12 joins the cylindrical turbulence chamber 13 of the burner 29 tangentially at one end. The opposite end of the turbulence chamber 13 is conically convergent and then meets a sylindrical leveling conduit 14, which is coaxial with the turbulence chamber and opens into the combustion chamber 3. At the former end of the turbulence chamber 13 there is a detachable front plate 15, to which the dispersion pipe 16, the ignition burner 17 and the flame monitoring devices 18 have been attached so that the dispersion pipe 16 extends coaxially via the turbulence chamber 13 into the leveling conduit 14.

The tangential mounting of the combustion gas inlet conduit 12 in the turbulence chamber 13 is structurally and in terms of maintenance the simplest solution and allows an obstacle-free monitoring of the combustion phenomenon via the flame monitoring devices 18 fitted in the front plate 15 and attached detachably to the inlet end of the turbulence chamber 13.

The fuel dispersion pipe 16 can be of any type known per se, and suitable dispersion pipes have been described in the book "Large Boiler Furnaces", R. Dolezal, Elsevier Publishing Company (1967), pages 156-159. The length of the dispersion pipe 16 in the burner 29 is preferably adjustable, for example by pushing the dispersion pipe 16 more or less inside the burner 29. The dispersion pipe 16 must, however, extend so far into the burner 29 that the end of the dispersion pipe 16 is at the conically convergent end 23 of the turbulence chamber 13, at the distance H, defined by the aforementioned formula, from the inlet end of the leveling conduit 14. The dispersion pipe 16 can, however, extend deeper into the burner 29, for example into the leveling conduit 14, as shown in FIG. 1, or as far as the combustion chamber, as shown in FIG. 3. In the latter case, however, it extends at maximum to such a distance from the outlet of the leveling conduit 14 as is one half of the inner diameter D of the leveling conduit 14.

The purpose of the leveling conduit 14 is to level out any pulses appearing in the gas mass and the uneven distribution of the gas directed from the one combustion gas inlet conduit 12 of the turbulence chamber 13 at the periphery of the outlet and to direct the revolving gas mass in a direction parallel to the axis of the turbulence chamber 13, as indicated by arrows in FIG. 3. The length of the leveling conduit 14 is in this case advantageously 0.5-4 times its inner diameter D.

The combustion gas spray 21 discharges from the leveling conduit 14 into the combustion chamber 3, or some other combustion space, forming a hollow cone the flare angle of which depends on, for example, the velocity of the tangential inflow of the turbulence chamber 13, on the ratios of the dimensions of the turbulence chamber 13 and the leveling conduit 14, and on the length of the leveling conduit 14.

The inner diameter of the turbulence chamber 13 is preferably 2-6 times the inner diameter D of the leveling conduit 14. The flare angle $\alpha$ of the conically convergent end 23 of the turbulence chamber 13 is preferably about 60°-120°. Furthermore, the length of the turbulence chamber 13 is preferably at minimum twice the diameter of the combustion gas inlet conduit 12, and the outer diameter d of the fuel dispersion pipe 16 is preferably at maximum 0.75 times the inner diameter D of the leveling conduit 14.

The inner diameter D of the leveling conduit 14 is thus relatively small and thereby effectively prevents the radiation of heat from the flame and the walls of the combustion chamber 3 or the combustion space into burner 29. Furthermore, the combustion gas flowing in the lining 30, fitted around the combustion chamber 3 and the burner 29, effectively cools the combustion chamber 3 and the burner 29 and its auxiliary devices.

In terms of combustion, it is advantageous that the fuel is vaporized effectively and then mixed with the combustion gas. The energy required for the vaporization is introduced into the fuel as heat of radiation and/or by contact with hot fuel gases.

The gas spray 21 discharging into the combustion chamber 3 has a very high velocity in the vicinity of the discharge outlet of the leveling conduit 14. Thus the gas spray 21 effectively absorbs the gases 22 of the combustion chamber 3. Thereby the gas spray 21 heats up rapidly, creating turbulences with a mixing effect in the combustion chamber 3. Since the discharging gas 21 revolves and has the shape of a hollow cone, it creates an effective return flow 22 on its central axis, and this return flow 22 extends as far as the immediate vicinity of the discharge outlet of the leveling conduit 14. This return flow 22 effectively vaporizes the fuel drops discharging from the dispersion pipe 16 and forces them into the rapid combustion gas flow 21 discharging from the leveling conduit 14, the fuel becoming effectively mixed with the flow. Owing to the high velocity, the ignition takes place after complete mixing, whereby the following advantages, among others, are gained: the combustion does not occur in the immediate vicinity of the lining of the inlet end of the combustion chamber 3 and the fuel has time to vaporize and be completely mixed, in which case the combustion is also complete within a wide air coefficient and control range. By using a burner according to the invention, it has been possible to burn heavy oil with a blue flame.

Of course, gas can be used for fuel. Since gas does not require heat for vaporization, it can be mixed with the oxygen-bearing combustion gas already in the leveling conduit 14. The high velocity of the thin gas layer flowing in the leveling conduit 14 prevents burning from occurring before the gas flow discharges into the combustion chamber 3. Using the burner according to the invention, it is possible to achieve a flow field very advantageous in terms of combustion and a simple structure in which the fuel feed and flame control devices can be fitted in an optimal way in terms of maintenance and operation.

EXAMPLE

Heavy fuel oil which contained non-combustibles 0.05% was burned using the burner 29 of the immersion evaporation plant depicted in FIG. 1. The dispersion pipe 16 was a turbulence chamber disperser operating with pneumatic auxiliary dispersion. The inner diameter of the combustion chamber 3 was 1.29 m and its length 2.3 m. The inner diameter of the turbulence chamber 13 was 500 mm, the length of its cylindrical part was 300 mm, the flare angle of the conical end 23 of the turbulence chamber 13 was 90°, and the inner diameter D of the leveling conduit 14 was 170 mm and its length 220 mm.

The results are given in the table below.

TABLE

| Oil kg/h | Secondary air | | | Flue gases | | | |
|---|---|---|---|---|---|---|---|
| | °C. | m³/h | λ | °C. | N | μ | CO₂-% | O₂-% |
| 228 | 102 | 3000 | 1.5 | 1492 | 0...1 | 21 | 10.7 | 6.3 |
| 227 | 96 | 3000 | 1.5 | 1410 | 0...1 | 15 | 10.2 | 7.2 |
| 223 | 89 | 2700 | 1.3 | 1554 | 0...1 | 48 | 12.0 | 4.4 |
| 179 | 99 | 2700 | 1.9 | 1229 | 0...1 | 10 | 8.1 | 10.2 |
| 151 | 96 | 3000 | 2.4 | 1129 | 0...1 | 10 | 2.4 | 6.5 |
| 133 | 62 | 2400 | 2.1 | — | 0...1 | 11 | 9.9 | 7.6 |
| 90 | 96 | 1900 | 2.4 | — | 0...1 | 8 | 6.6 | 12.6 |

λ is the air coefficient (determined on the basis of flue gas analysis)
N is the smoke scale Bacharach
μ is the dust content in mg/m³ at a point after the combustion chamber (101.3 kPa, 273 K)

It can be seen from the above table that the combustion was very effective and the dust content in the flue gases was less than could be expected on the basis of the fuel type. The combustion was complete even using a low oil feed temperature. The combustion capacity could be controlled within a wide range.

A capacity value as high as 250 kg oil/h was reached, which corresponded to a solution feed of 3.75 m³/h. Even in this case, the limit of capacity was not set by the combustion chamber or combustion, but by the further treatment of the crystals produced. Control downwards extended at least as low as 25 kg oil/h.

Owing to its advantageous position and easy monitoring, the dispersion pipe 16 had to be cleaned only according to need, and in practice it was cleaned at intervals of 1–4 weeks. Even in this case it was possible to carry out the cleaning without turning off the combustion gas feed, and thus no other devices had to be adjusted during the dispersion pipe maintenance.

The immersion evaporator according to the invention is used advantageously for the evaporation of metal sulfate solutions and the like, especially in the combustion chambers of the immersion burners of metal sulfate crystallization plants. In this case, the composition chamber 3 with its burner 20 is preferably installed at a right angle in relation to a substantially vertical immersion pipe 26.

What is claimed is:

1. An immersion evaporator of the type comprising:
   (a) an evaporation vessel and connected thereto;
   (b) a combustion chamber having at one end thereto a burner for liquid or gaseous fuel, the burner comprising a cylindrical combustion gas turbulence chamber for an oxygen-bearing combustion gas, one end of which is convergent in order to increase the angular velocity of the combustion gas before the fuel discharging from the dispersion pipe is mixed with it, the opposite end having a substantially tangential combustion gas inlet conduit connected to a mantle which surrounds at least in part the burner and the combustion chamber, there being, at the opposite end of the mantle, a fuel inlet conduit for preheating the fuel, and the convergent end of the turbulence chamber continues into the combustion chamber as a cylindrical leveling conduit coaxial with the turbulence chamber, and a fuel dispersion pipe extending coaxially into the turbulence chamber, and having at least such a length that it extends to the distance defined by the formula $$\frac{H}{D} = \frac{\sqrt{(\frac{d}{D})^2 + \cos\alpha}}{\sin 2\alpha} - \frac{d}{2D}\tan\alpha - \frac{1}{2\tan\alpha}$$

from the inner end of the leveling conduit, in which formula H is the distance between the inlet end of the leveling conduit and the dispersion pipe, α is the angle of convergence of the opposite end of the turbulence chamber, d is the outer diameter of the dispersion pipe, and D is the inner diameter of the leveling conduit;
   (c) means for feeding a solution to be concentrated into the evaporation vessel;
   (d) means for removing the concentrated solution and any crystals from the evaporation vessel;
   (e) means for removing flue gases and vapors from the evaporation vessel; and
   (f) an immersion pipe extending substantially vertically inside the evaporation vessel, for directing the hot flue gases below the surface of the solution in the evaporation vessel, and having an upper end which is connected, by means of an angle joint piece to the outlet of the combustion chamber, so that the combustion chamber and the immersion pipe are at an angle in relation to each other.

2. The immersion evaporator of claim 1, in which the length of the leveling conduit is 0.5–4 times its inner diameter D.

3. The immersion evaporator of claim 1, in which the outer diameter of the fuel feed pipe is at maximum 0,75 times the inner diameter D of the leveling conduit.

4. The immersion evaporator of claim 1, in which the fuel feed pipe extends via the leveling conduit and at maximum over a distance half the inner diameter D beyond the leveling conduit into the combustion chamber.

5. The immersion chamber of claim 1, in which the inner diameter of the turbulence chamber is 2–6 times the inner diameter D of the leveling conduit.

6. The immersion evaporator of claim 1, in which the convergent end of the turbulence chamber is conical and that its flare angle α is about 60°–120°.

7. The immersion evaporator of claim 1, in which the length of the turbulence chamber is at minimum twice the diameter of the combustion gas inlet conduit.

8. The immersion evaporator of claim 1, in which the leveling conduit terminates at the inner wall of the combustion chamber.

9. The immersion evaporator of claim 1, in which one end of the turbulence chamber is covered with a detachable plate, to which the fuel feed pipe, an ignition burner and flame monitoring devices have been attached.

10. The immersion evaporator of claim 1, in which between the immersion pipe and the angle joint piece there is a resilient member, only the immersion pipe being attached directly to the evaporation vessel.

11. The immersion evaporator of claim 1, in which the fuel inlet conduit is tangentially connected to the mantle.

12. The immersion evaporator of claim 1, in which the immersion pipe and the combustion chamber are at an angle of 90° to each other.

* * * * *